United States Patent [19]

Pagano et al.

[11] Patent Number: 5,229,803
[45] Date of Patent: Jul. 20, 1993

[54] FILM CASSETTE AND ASSOCIATED CAMERA DEVICE

[75] Inventors: Daniel M. Pagano, Henrietta; Stephen H. Miller, Rochester, both of N.Y.

[73] Assignee: Eastman Kodak Company, Rochester, N.Y.

[21] Appl. No.: 880,783

[22] Filed: May 11, 1992

[51] Int. Cl.⁵ .............................................. G03B 17/26
[52] U.S. Cl. .................................... 354/275; 242/71.1
[58] Field of Search .......................... 354/275, 21, 354; 242/71.1

[56] References Cited

U.S. PATENT DOCUMENTS

| 3,784,001 | 1/1974 | Bushnell et al. | 206/52 F |
| 4,682,870 | 7/1987 | Atkinson | 354/275 |
| 4,883,235 | 11/1989 | Niedospial, Jr. | 354/275 |
| 5,032,862 | 7/1991 | Behnke | 354/275 |

Primary Examiner—David M. Gray
Attorney, Agent, or Firm—Roger A. Fields

[57] ABSTRACT

A film cassette comprising a cassette shell having an end face with an end opening, and a rotatable spool core supported inside the shell with one end protruding through the end opening to outside the shell, is characterized in that a covering label is affixed to the end face of the shell and to the one end of the spool core to prevent rotation of the spool core. The covering label is frangible to allow it to be broken to permit rotation of the spool core and to provide a visible indication the cassette was used. The end face of the shell has a relieved area which immediately surrounds the end opening in the end face along a location beneath the covering label. When the cassette is loaded into a photographic camera, a fracturing piece is received into the relieved area which breaks the covering label.

5 Claims, 2 Drawing Sheets

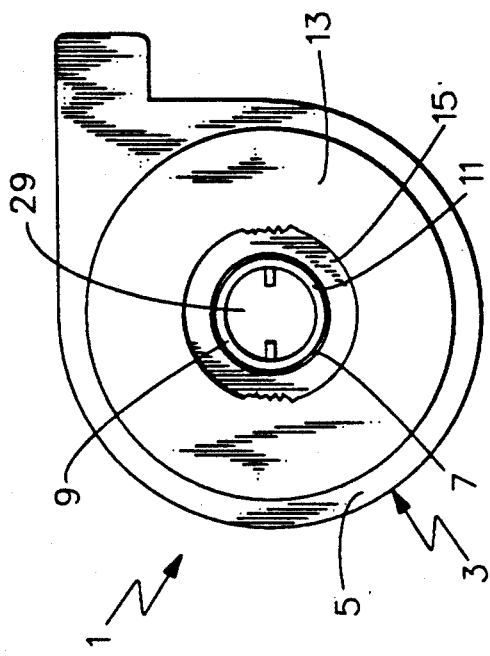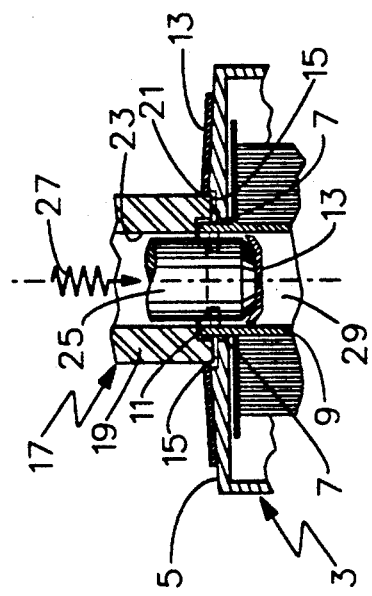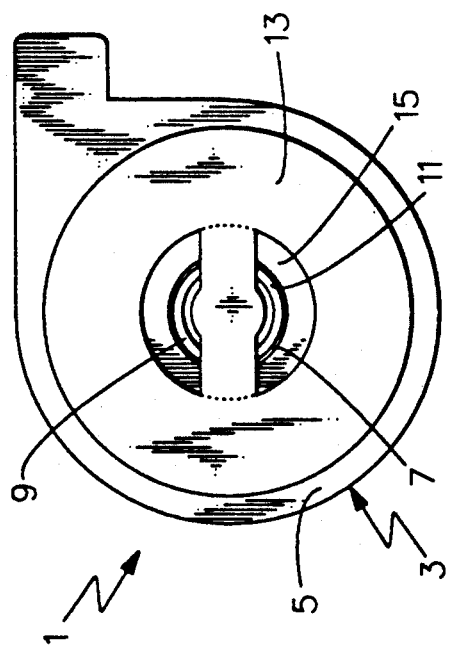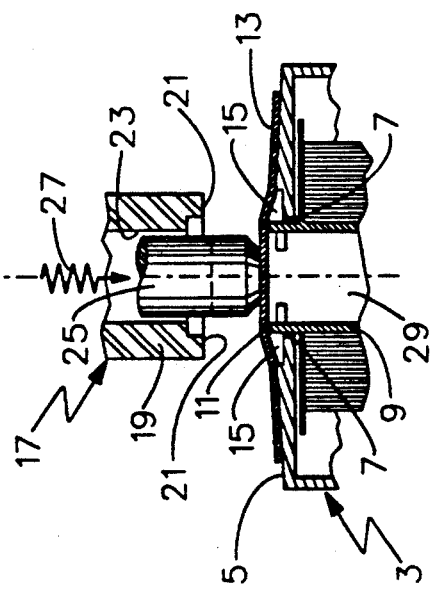

FILM CASSETTE AND ASSOCIATED CAMERA DEVICE

BACKGROUND OF THE INVENTION

1. Field of the Invention

The invention relates generally to the field of photography, and in particular to a film cassette having frangible means for preventing rotation of a film spool inside the cassette and to a camera device that breaks the frangible means to permit rotation of the film spool.

2. Description of the Prior Art

Prior art U.S. Pat. No. 3,784,001, issued Jan. 8, 1974, discloses a film cassette in which there is a frangible connection between a film spool and an internal wall of the cassette shell. The frangible connection has sufficient strength to prevent the film spool from rotating during handling of the film cassette prior to use but which will break when a filmstrip wound on the spool is pulled from the shell. Since the frangible connection is located inside the shell, there is no way of knowing when it is broken.

Prior art U.S. Pat. No. 4,683,870, issued Jul. 28, 1987, discloses a film cassette in which a film spool has a coaxial opening containing a frangible piece. When the film cassette is loaded into an associated camera, a shaft is received in the coaxial opening to fracture the frangible piece and thereby provide an indication the cassette was used. No means exists, however, for preventing rotation of the film spool during handling prior to use.

SUMMARY OF THE INVENTION

A film cassette comprising a cassette shell having an end face with an end opening, and a rotatable spool core supported inside the shell with one end protruding through the end opening to outside the shell, is characterized in that a covering label is affixed to the end face of the shell and to the one end of the spool core to prevent rotation of the spool core. The covering label is frangible to allow it to be broken to permit rotation of the spool core and to provide a visible indication the cassette was used. The end face of the shell has a relieved area which immediately surrounds the end opening in the end face along a location beneath the covering label. When the cassette is loaded into a photographic camera, a fracturing piece is received into the relieved area which breaks the covering label.

BRIEF DESCRIPTION OF THE DRAWINGS

FIG. 1 is an end view of a film cassette including a covering label that functions as a lock for a film spool inside the cassette shell, according to a preferred embodiment of the invention;

FIG. 2 is a section view of the film cassette and a camera device for breaking the covering label to permit rotation of the film spool;

FIG. 3 is an end view similar to FIG. 1, depicting the covering label when it is broken;

FIG. 4 is a section view similar to FIG. 2, depicting the covering label when it is broken;

DETAILED DESCRIPTION OF THE PREFERRED EMBODIMENT

Figure 6:
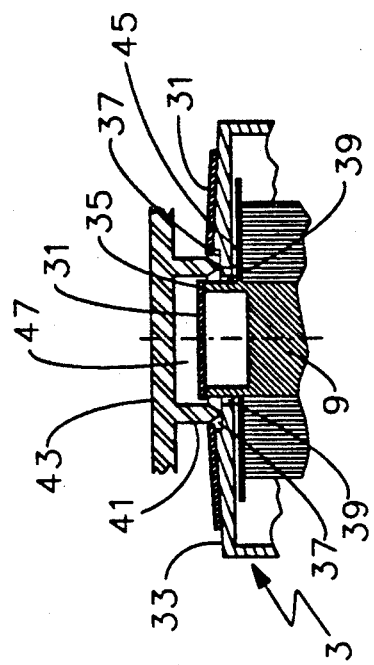
FIG. 6 is a section view similar to FIG. 5, depicting the covering label when it is broken.

The invention is disclosed as being embodied preferably in a 35 mm film cassette and a corresponding camera. Because such a film cassette and photographic camera are well known, this description is directed only to those elements forming part of or cooperating directly with the invention. It is to be understood, however, that any elements not shown or described may take various forms known to persons having ordinary skill in the photographic arts.

Referring now to FIGS. 1 and 2 of the drawings, a 35 mm film cassette 1 comprises a cassette shell 3 having an end face 5 with an end opening 7, and a rotatable spool core 9 supported inside the shell with one end 11 protruding through the end opening to outside the shell. A covering label 13 made of paper or very thin plastic to be frangible is affixed by glueing to the end face 5 of the shell 3 and to the one end 11 of the spool core 9 to prevent rotation of the spool core relative to the shell. The covering label 13 is frangible to allow it to be broken or torn to permit rotation of the spool core 9 and to provide a visible indication the cassette 1 was used. See FIGS. 3 and 4.

As shown in FIGS. 2 and 4, the end face 5 of the shell 3 has a relieved area 15 which immediately surrounds the end opening 7 in the end face along a location beneath the covering label 13 to provide clearance for the covering label to be broken.

A camera device 17, shown in FIGS. 2 and 4, comprises a fracturing piece 19 having a cutting end 21 sized to be received into the relieved area 15 in the end face 5 of the shell 3 to break the covering label 13. The fracturing piece 19 has a central opening 23 arranged to be aligned with the end opening 7 in the end face 5 when the fracturing piece is received into the relieved area 15. A spool driver 25 protrudes under the urging of a helical compression spring 27 from the central opening 23 to be received into a coaxial opening 29 in the one end 11 of the spool core 9 as the fracturing piece 19 is received into the relieved area 15. The spool driver 25 is intended to engage the spool core 9 inside its coaxial opening 29 in a conventional manner, such as described in U.S. Pat. No. 4,682,870.

Figure 5:
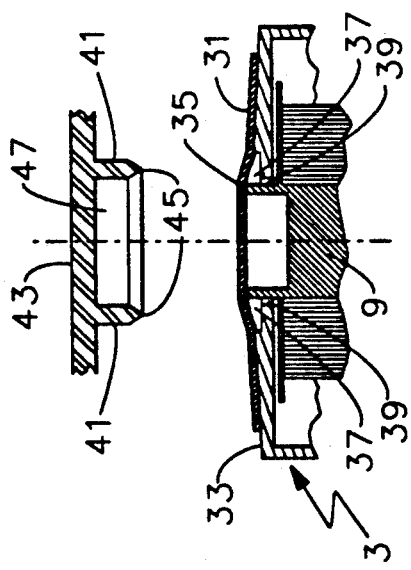
FIG. 5 is a section view of the film cassette and the camera device according to an alternate embodiment of the invention, depicting the covering label before it is broken.

FIGS. 5 and 6 illustrate an alternate embodiment of the film cassette 1 and the fracturing piece 19. In this instance, a covering label 31 which is the same as the covering label 13 is affixed by glueing to an end face 33 of the shell 3 and to an opposite end 35 of the spool core 9 to prevent rotation of the spool core relative to the shell. The end face 33 of the shell 3 has a relieved area 37 which immediately surrounds an end opening 39 in the end face 33 along a location beneath the covering label 31 to provide clearance for the covering label to be broken.

A fracturing piece 41 mounted on a camera door 43 has a cutting end 45 sized to be received into the relieved area 37 in the end face 33 of the shell 3 to break the covering label 31 when the door is closed. The fracturing piece 41 has a central opening 47 arranged to be aligned with the end opening 39 in the end face 33 when the fracturing piece 41 is received into the relieved area 37.

The invention has been described with reference to preferred and alternate embodiments. However, it will be appreciated that various modifications can be effected within the ordinary skill in the art without departing from the scope of the invention.

We claim:

1. A film cassette comprising a cassette shell having an end face with an end opening, and a rotatable spool core supported inside said shell with one end protruding through said end opening to outside the shell, is characterized in that:

a covering label is affixed to said end face of the shell and to said one end of the spool core to prevent rotation of the spool core but is frangible to allow it to be broken, whereby breaking said covering label will permit rotation of the spool core and will provide a visible indication said cassette was used.

2. A film cassette as recited in claim 1, wherein said end face of the shell has a relieved area which immediately surrounds said end opening in the end face along a location beneath said covering label to provide clearance for the covering label to be broken.

3. A camera device for use with a film cassette comprising a cassette shell having an end face with an end opening, a rotatable spool core supported inside said shell with one end protruding through said end opening to outside the shell, a frangible label affixed to said end face and to said one end to prevent rotation of said spool core, and a relieved area in said end face immediately surrounding said end opening along a location beneath said frangible label, said camera device characterized by:

a fracturing piece having a cutting end sized to be received into said relieved area in the end face of the shell to break said frangible label to permit rotation of the spool core and to provide a visible indication said cassette was used.

4. An improved combination of a camera device and a film cassette comprising a cassette shell having an end face with an end opening, and a rotatable spool core supported inside said shell with one end protruding through said end opening to outside the shell, is characterized in that:

a covering label is affixed to said end face of the shell and to said one end of the spool core to prevent rotation of the spool core but is frangible to allow it to be broken to permit rotation of the spool core and to provide a visible indication said cassette was used;

said end face of the shell has a relieved area which immediately surrounds said end opening in the end face along a location beneath said covering label to provide clearance for the covering label to be broken; and a fracturing piece has a cutting end sized to be received into said relieved area to break said covering label.

5. An improved combination as recited in claim 4, wherein said one end of the spool core has a coaxial opening, said fracturing piece has a central opening arranged to be aligned with said end opening in the end face of the shell when the fracturing piece is received into the relieved area, and a spool driver protrudes from said central opening to be received into said coaxial opening as the fracturing piece is received into the relieved area.

* * * * *